(12) United States Patent
Powell et al.

(10) Patent No.: US 8,730,212 B2
(45) Date of Patent: May 20, 2014

(54) ILLUMINATOR FOR TOUCH- AND OBJECT-SENSITIVE DISPLAY

(75) Inventors: Karlton Powell, Lake Stevens, WA (US); Prafulla Masalkar, Issaquah, WA (US); Timothy Large, Bellevue, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 12/621,785

(22) Filed: Nov. 19, 2009

(65) Prior Publication Data

US 2011/0043490 A1    Feb. 24, 2011

Related U.S. Application Data

(60) Provisional application No. 61/235,962, filed on Aug. 21, 2009.

(51) Int. Cl.
*G06F 3/042* (2006.01)

(52) U.S. Cl.
USPC .......................................................... 345/176

(58) Field of Classification Search
None
See application file for complete search history.

(56) References Cited

U.S. PATENT DOCUMENTS

| | | | |
|---|---|---|---|
| 5,377,083 A | 12/1994 | Tada | |
| 6,421,104 B1 | 7/2002 | Richard | |
| 6,700,632 B2 | 3/2004 | Taniguchi et al. | |
| 6,738,051 B2 | 5/2004 | Boyd et al. | |
| 6,867,828 B2 * | 3/2005 | Taira et al. | 349/65 |
| 6,891,530 B2 | 5/2005 | Umemoto et al. | |
| 7,424,197 B2 | 9/2008 | Winston et al. | |
| 2002/0101399 A1 * | 8/2002 | Kubo et al. | 345/104 |
| 2003/0095401 A1 | 5/2003 | Hanson et al. | |
| 2007/0300182 A1 * | 12/2007 | Bilow | 715/799 |
| 2008/0007541 A1 * | 1/2008 | Eliasson et al. | 345/176 |

(Continued)

FOREIGN PATENT DOCUMENTS

| | | |
|---|---|---|
| CN | 101441541 A | 5/2009 |
| JP | 2002369064 A | 12/2002 |

(Continued)

OTHER PUBLICATIONS

"LCD Backlightin Technolgies and Configurations", retrieved at <<http://hitachi-displays-eu.com/doc/AN-007_Backlighting.pdf>>, Sep. 2004, pp. 10.

(Continued)

*Primary Examiner* — Nicholas Lee
(74) *Attorney, Agent, or Firm* — Jeremy Snodgrass; Glen Johnson; Micky Minhas

(57) ABSTRACT

An integrated vision and display system comprises a display-image forming layer configured to transmit a display image for viewing through a display surface; an imaging detector configured to image infrared light of a narrow range of angles relative to the display surface normal and including a reflection from one or more objects on or near the display surface; a vision-system emitter configured to emit the infrared light for illuminating the objects; a visible- and infrared-transmissive light guide having opposing upper and/or lower face, configured to receive the infrared light from the vision-system emitter, to conduct the infrared light via TIR from the upper and lower faces, and to project the infrared light onto the objects outside of the narrow range of angles relative to the display surface normal.

19 Claims, 5 Drawing Sheets

(56) References Cited

U.S. PATENT DOCUMENTS

| | | | |
|---|---|---|---|
| 2008/0088593 A1* | 4/2008 | Smoot | 345/173 |
| 2009/0128508 A1* | 5/2009 | Sohn et al. | 345/173 |
| 2009/0147535 A1 | 6/2009 | Mienko et al. | |
| 2009/0322706 A1* | 12/2009 | Austin | 345/175 |

FOREIGN PATENT DOCUMENTS

| | | |
|---|---|---|
| JP | 2007506178 A | 3/2007 |
| JP | 2008158616 A | 7/2008 |
| JP | 2009147553 A | 7/2009 |

OTHER PUBLICATIONS

Large, Timothy Andrew et al. "An Optic Having a Cladding", U.S. Appl. No. 12/474,014, filed May 28, 2009, pp. 44.

Emerton, Neil et al. "Making an Optic with a Cladding", U.S. Appl. No. 12/474,032, filed May 28, 2009, pp. 43.

Large, Timothy Andrew et al., "An Optic Having a Dichroic Reflector", U.S. Appl. No. 12/474,000, filed May 28, 2009, pp. 42.

"International Search Report", Mailed Date: May 26, 2011, Application No. PCT/US2010/046141, Filed Date: Aug. 20, 2010, pp. 8.

* cited by examiner

US 8,730,212 B2

ILLUMINATOR FOR TOUCH- AND OBJECT-SENSITIVE DISPLAY

CROSS-REFERENCE TO RELATED APPLICATIONS

This application claims priority to U.S. Provisional Application 61/235,962, filed on Aug. 21, 2009, entitled FRONT LIGHT FOR TOUCH AND OBJECT SENSITIVE DISPLAY, the entirety of which is hereby incorporated by reference herein for all purposes.

BACKGROUND

Vision-based input systems make it easier for people to interact with computers. In particular, the ability of a computer to discern touch and identify objects enables a wide array of natural, intuitive input mechanisms. Accordingly, further development of vision-based input technologies may provide a practical alternative to keyboard- and mouse-based input mechanisms. For greater functionality, compactness, and design flexibility, a vision-based input system may share space with a display system, such as a flat-panel display system.

SUMMARY

An integrated vision and display system is provided. The system includes a display-image forming layer configured to transmit a display image for viewing through a display surface. The system also includes an imaging detector configured to image infrared light of a narrow range of angles relative to the display surface normal. Here, the imaged infrared light includes a reflection from one or more objects arranged on or near the display surface. The system also includes a vision-system illuminator, comprising a vision-system emitter, and a visible- and infrared-transmissive light guide. The vision-system emitter is configured to emit infrared light for illuminating the one or more objects. The light guide is configured to receive the infrared light from the vision-system emitter. The light guide conducts the infrared light via total internal reflection, and projects the infrared light onto the one or more objects outside of the narrow range of angles relative to the display surface normal.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The subject matter of the present disclosure is now described by way of example and with reference to certain illustrated embodiments. Components that may be substantially the same in two or more embodiments are identified coordinately and are described with minimal repetition. It will be noted, however, that components identified coordinately in the different embodiments may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
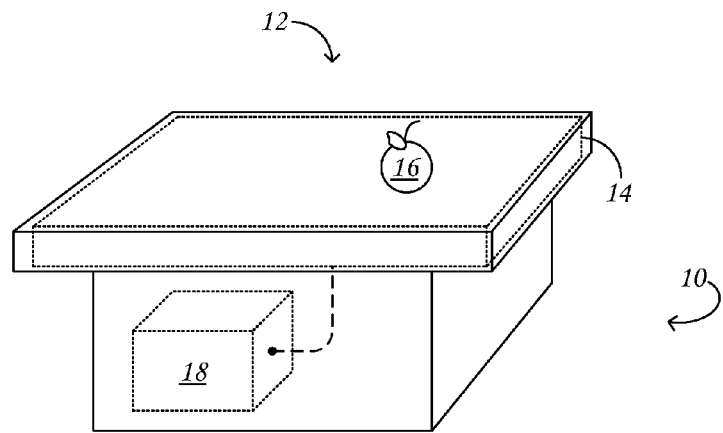
FIG. 1 shows aspects of a work station in accordance with an embodiment of the present disclosure.

FIG. 1 shows aspects of a work station 10 in one example embodiment. The work station includes a large-format, touch- and object-sensitive display surface 12, which may be oriented horizontally. In this orientation, one or more persons may stand or be seated next to the work station in order to view and interact with the display surface from above. Optical system 14 is located below the display surface. The optical system may be configured to provide display functionality as well as vision-based input functionality for the work station. Accordingly, the optical system may comprise an integrated display and vision system.

To provide display functionality, optical system 14 may be configured to project a visible image through display surface 12. To provide vision-based input functionality, the optical system may be configured to capture at least a partial image of one or more objects 16 placed on or near the display surface—fingers, game pieces, electronic devices, paper cards, food or beverages, for example. Accordingly, the optical system may be configured to illuminate the objects and to detect light reflected from the objects. In this manner, the optical system may register the position, footprint, or other property of the objects placed on or near the display surface.

FIG. 1 shows computer 18 concealed within work station 10 and operatively coupled to optical system 14. In other embodiments, the computer may be located and/or distributed remotely, and coupled to the optical system via a wired or wireless communications link. Irrespective of its location, the computer may be configured to provide display data to and receive input data from the optical system. Further, the computer may be configured to process the input data to yield information of various kinds.

Figure 2:
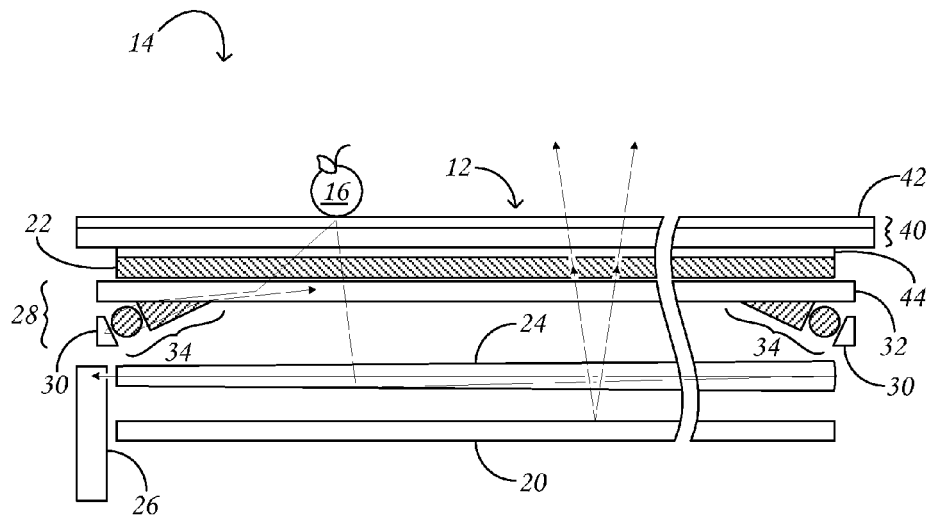
FIG. 2 is a schematic, cross-sectional view showing aspects of an optical system in accordance with an embodiment of the present disclosure.

FIG. 2 is a schematic, cross-sectional view showing aspects of optical system 14 in one example embodiment. The optical system includes a liquid-crystal display (LCD) backlight 20 arranged to project visible light on and partly through LCD control layer 22. Together, the LCD backlight and the LCD control layer are arranged to form a display image viewable through display surface 12.

LCD backlight 20 may comprise any light source suitably configured for use in an LCD display system; it may comprise a suitable brightness-enhancement film, an angle-limiting film or other structure, and one or more illumination-profiling layers. In one embodiment, the LCD backlight may comprise one or more compact cylindrical fluorescent (CCFL) light sources. In another embodiment, the LCD backlight may comprise one or more light-emitting diodes (LED's)—red, green, and blue LED's, or integrated white LED's, for example.

LCD control layer 22 is a display-image forming layer configured to transmit a display image for viewing through display surface 12; it comprises a two-dimensional array of light-gating elements configured to spatially and temporally modulate the intensity of light from LCD backlight 20. In one embodiment, the light-gating elements may be polarizing LCD elements coupled to red, green, and blue transmissive windows. In one embodiment, the LCD control layer and the LCD backlight may be operatively coupled to computer 18 and configured to receive display data therefrom.

Continuing in FIG. 2, optical system 14 includes imaging optic 24 and imaging detector 26. The imaging optic may be wedge-shaped, having substantially planar and opposing upper and lower faces, which define a wedge angle of one degree or less. The upper face of the imaging optic may be configured to admit light reflected from one or more objects 16 arranged on or near display surface 12. The lower face may comprise a turning film configured to turn the reflected light towards a curved edge face of the imaging optic. The curved edge face may support a reflective Fresnel structure configured to focus and reflect the light toward imaging detector 26. In one embodiment, light reflected from objects on the display surface may propagate to and from the curved edge face via total internal reflection (TIR) from the upper and lower faces of the imaging optic.

Imaging detector 26 may be configured to image a reflection from one or more objects 16 arranged on or near display surface 12. The imaging detector may be configured to capture at least a partial image of the objects, and provide corresponding image data to computer 18. Accordingly, the computer may be configured to receive and process the image data from the imaging detector, and thereby respond to a position of the objects. In one embodiment, the imaging detector may comprise a digital camera.

Imaging detector 26 may image some reflections from objects 16 and exclude others. In particular, the reflections imaged by the imaging detector may be confined to a narrow (e.g., ±10 degrees) range of angles relative to the display surface normal, i.e., a direction normal to display surface 12. Such confinement may be enabled in view of at least three design features of the illustrated configuration. First, the imaging detector may include an aperture configured to admit light from within an angularly restricted 'field of view' of the imaging detector, and to reject light from outside the field of view. Second, the wedge shape of imaging optic 24 may inherently limit the acceptance cone of light coupling in from the upper face to a relatively narrow range of angles (e.g., 2 to 3 degrees). As the imaging optic is substantially telecentric in terms of the pointing angle of the acceptance cone versus position across the optic, variation of the pointing angle may be within 10 degrees of surface normal at any location across the upper surface. Third, the imaging optic may be configured to map position space at the acceptance window to angle space at the exit window, where a lens of the imaging detector may be placed. Due to the position to angle mapping exhibited by the imaging optic and the lens (which converts angle content at the exit window back into spatial content at the imaging detector) the display surface may be imaged onto the imaging detector; thus the field of view imaged by the imaging detector comprises an image of the display surface. Because reflections from objects 16 on or near display surface 12 may be substantially diffuse, having large (e.g., Lambertian) angular subtend, light reflected downward from the objects, substantially normal to display surface 12, may be imaged, but light of greater incidence angles with respect to the display surface may not be imaged. Such a configuration may help to avoid unwanted contrast reduction in the captured image due to light scattering downward from the vision-system illuminator, as further described below.

Imaging detector 26 may include one or more optical filters—color or interference filters, for example—arranged in front of the aperture to limit the response of the imaging detector to one or more wavelength bands. The optical filters may include high-pass, low-pass, or band-pass filters; they may be infrared-transmissive, visible-absorbing, and/or visible-reflecting, for example. In one embodiment, one or more optical filters may be configured to limit the imaging detector response to a narrow wavelength band emitted by a vision-system illuminator, as further described below.

FIG. 2 shows just one embodiment of optical system 14. In other embodiments, imaging optic 24 and imaging detector 26 may be replaced by a tiling of short-throw imaging detectors, each capturing an image from a localized part of display surface 12. Accordingly, computer 18 may be configured to receive an image from each of the imaging detectors and to assemble a combined image therefrom. In still other embodiments, an offset-imaging configuration may be used to image the objects arranged on or near the display surface.

Continuing in FIG. 2, optical system 14 includes vision-system illuminator 28. The vision-system illuminator is configured to illuminate the objects arranged on or near the display surface, thereby supplying the light which is detected, as described above, upon reflection from the objects. In the illustrated embodiment, the vision-system illuminator comprises vision-system emitter 30, light guide 32, and coupling structure 34.

Vision-system emitter 30 may be configured to emit infrared light. In one embodiment, the vision-system emitter may emit light of a narrow wavelength band centered at 850 nanometers. Accordingly, the vision-system emitter may comprise an array of infrared light-emitting diodes (IR-LED's) arranged along one or more sides or edges of light guide 32. In one embodiment, the IR-LED's may be arranged along one edge of the light guide and spaced 10 to 20 millimeters apart from each other—although different spacings are contemplated as well; in another embodiment, the array of IR-LED's may be distributed along opposite edges of the light guide.

Light guide 32 may comprise a sheet-like or wedge-shaped monolith having opposing upper and lower faces and configured to receive infrared light from vision-system emitter 30. In subsequent drawing figures, which illustrate the light guide more particularly, reference number 36 is used to identify a sheet-like light guide, and reference number 38 is used to identify a wedge-shaped light guide. Continuing in FIG. 2, the light guide may be formed from a material transmissive in one or more infrared wavelength bands and in one or more visible wavelength bands. In particular, the material may be transmissive over at least some wavelengths emitted by vision-system emitter 30 and at least some wavelengths emitted by LCD backlight 20. The light guide may be configured to conduct the infrared light via TIR from the upper and lower faces, and to project the infrared light onto objects 16 outside of the narrow range of angles admitted by imaging detector 26.

Coupling structure 34 may be any arrangement of collection optics configured to partly converge and couple light from vision-system emitter 30 to light guide 32. Several embodiments of the coupling structure are described hereinafter, with reference to FIGS. 3 through 10. In each embodiment, the relative arrangement and material properties of the vision-system emitter, the coupling structure, and the light guide may be chosen such that divergent light from the vision-system emitter is collected and coupled into the light guide.

Continuing in FIG. 2, optical system 14 includes protective layer 40. The protective layer may comprise a sheet formed from a visible- and infrared-transmissive material substantially as described for light guide 32. In the illustrated embodiment, the upper face of the protective layer comprises a weakly diffusive layer 42, configured to abate specular reflection of ambient light. In other embodiments, the protective layer may comprise any suitable anti-reflective coating. In the illustrated embodiment, protective layer 40 is coupled to LCD control layer 22 via moderately diffusive layer 44, which is configured to mask or obscure the various internal components of the optical system from view through display surface 12. In one embodiment, the moderately diffusive layer may provide an angular spread of the display light on the order of 35 to 45 degrees FWHM, making the internal components of the optical system less noticeable to the viewer.

As shown in FIG. 2, LCD control layer 22 may be layered between light guide 32 and display surface 12. It will be understood, however, that other configurations fully consistent with this disclosure may present a different configuration of layers. In particular, the light guide may be layered between the display-image forming layer and the display surface, e.g., the light guide may be disposed above the LCD control layer to reduce illumination losses from the LCD control layer, as further described below. And, in some embodiments, any or all of protective layer 40 and diffusive layers 42 and 44 may be omitted from the optical system, the functionality of these layers being subsumed into other components of the optical system.

Figure 3:
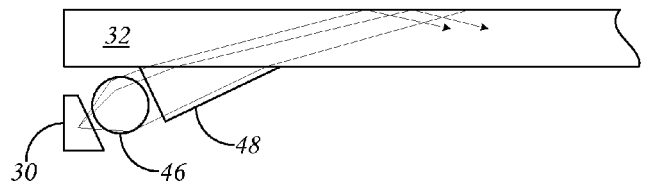
FIGS. 3-10 are schematic, cross-sectional views showing aspects of coupling structures in accordance with different embodiments of the present disclosure.
Figure 4:
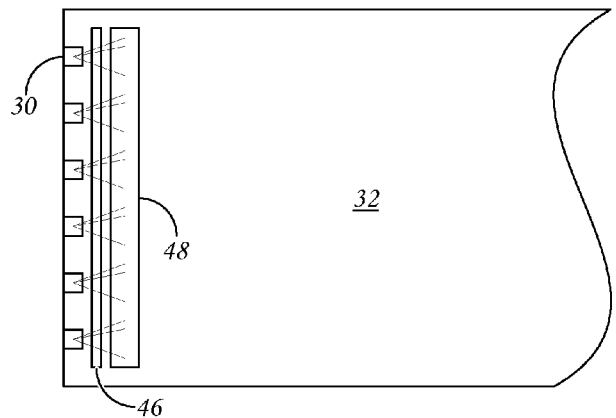

FIG. 3 is a schematic, cross-sectional view showing aspects of a coupling structure in one example embodiment. The illustrated coupling structure comprises rod lens 46 and corner prism 48. The hypotenuse face of the corner prism is optically coupled flush against the lower face of light guide 32, near and parallel to a lower-face edge of the light guide. The rod lens is aligned with a basal face of the corner prism, below the light guide and parallel to a lower-face edge of the light guide. Relative to the basal face of the corner prism, vision-system emitter 30 is disposed on the diametrically opposite side of the rod lens. In one embodiment, the rod lens and the corner prism may be formed from acrylic or polycarbonate. The rod lens may be a 3 millimeter diameter extruded acrylic rod, for example.

In this and subsequent embodiments, rod lens 46 is configured to narrow the cone of light emitted by vision-system emitter 30, so that the great majority of the light is transmitted through and nearly parallel to the horizontal plane of symmetry of light guide 32, with relatively few reflections from the upper and lower faces of the light guide. In some embodiments, the same rod lens 46 may serve to couple light from a plurality of vision-system emitters into the light guide. This arrangement is seen more easily from FIG. 4, which provides a plan view of the embodiment from below. In one embodiment, the rod lens may span the lower-face edge of the light guide. Other embodiments may include a rod lens and a corner prism oriented along each of two opposing lower-face edges of the light guide. In embodiments that include a rod lens, only light substantially in the dimension normal to the horizontal plane of the light guide is collected into a lower divergence, so the lateral spread of light in horizontal plane occurs over a short optical path, which may be useful in some cases to achieve high uniformity in a shortest optical path along the light guide. In other embodiments, where dome lenses provide focusing (vide infra), light is collected in two dimensions, and thus may require a longer optical path along the light guide before achieving a similar level of uniformity across the lateral dimension of the light guide.

Figure 5:
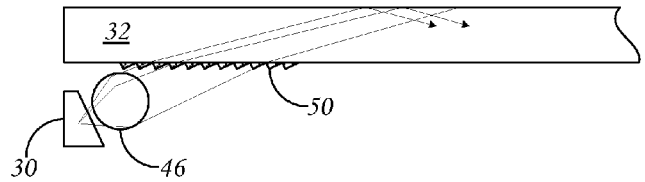

FIG. 5 is a schematic, cross-sectional view showing aspects of a coupling structure in another example embodiment. The illustrated coupling structure comprises rod lens 46 and Fresnel prism 50. The Fresnel prism is optically coupled flush against the lower face of light guide 32, near and parallel to a lower-face edge of the light guide. The rod lens is arranged below the light guide, parallel to the lower-face edge of the light guide, and is configured to couple light into the Fresnel prism. In one embodiment, the rod lens may span the lower-face edge of the light guide. Other embodiments may include a rod lenses and a Fresnel prism oriented along each of two opposing lower-face edges of the light guide. In other embodiments, a prismatic grating may be used in place of the Fresnel prism. In still other embodiments, the prismatic grating may be supplemented by a lenticular array for combined optical power.

Figure 6:
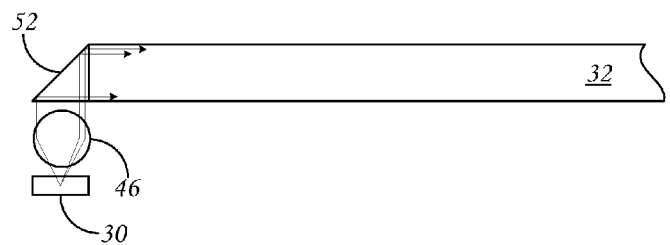

FIG. 6 is a schematic, cross-sectional view showing aspects of a coupling structure in another example embodiment. The illustrated coupling structure comprises rod lens 46 and corner prism 52 having a silvered hypotenuse face. A basal face of the corner prism is aligned flush against an edge face of light guide 32. The rod lens is aligned with the adjacent basal face of the corner prism, below the light guide and parallel to a lower-face edge of the light guide. In one embodiment, the rod lens may span the lower-face edge of the light guide. Other embodiments may include two rod lenses and two corner prisms oriented along opposing edge faces of the light guide. Still, other embodiments may include a corner prism having a hypotenuse face which is not silvered, and uses TIR at the fold. In such case, the light collection divergence may be low in order to maintain high efficiency of coupling.

Figure 7:
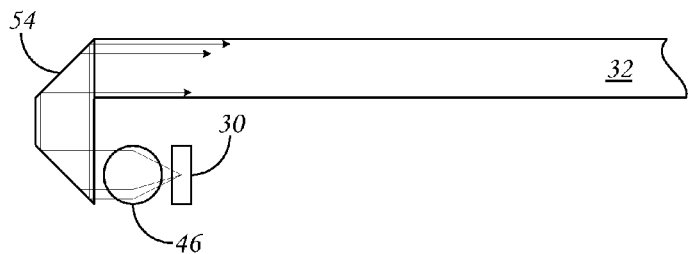

FIG. 7 is a schematic, cross-sectional view showing aspects of a coupling structure in another example embodiment. The illustrated coupling structure comprises rod lens 46 and trapezoidal prism 54 having silvered oblique faces. The long basal face of the trapezoidal prism comprises opposing first and second end regions. The first end region of the long basal face is aligned flush against an edge face of light guide 32. The second end region of the long basal face is aligned with the rod lens, below the light guide and parallel to a lower-face edge of the light guide. In one embodiment, the trapezoidal prism may be formed from acrylic or polycarbonate. In one embodiment, the rod lens may span the lower-face edge of the light guide. Other embodiments may include a rod lens and a trapezoidal prism oriented along each of two opposing edge faces of the light guide. In still another embodiment, the coupling structure may include a trapezoidal prism having oblique faces which are not silvered.

Figure 8:
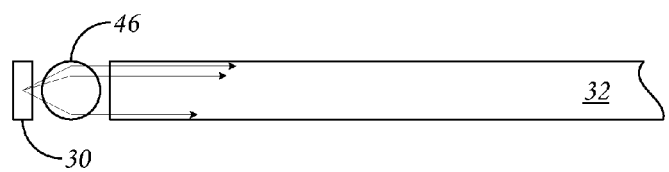

FIG. 8 is a schematic, cross-sectional view showing aspects of a coupling structure in another example embodiment. The illustrated coupling structure comprises rod lens 46. The axis of the rod lens may lie in a horizontal symmetry plane of light guide 32 and be oriented parallel to an edge face of the light guide. In one embodiment, the rod lens may span the edge face of the light guide. Other embodiments may include a rod lens oriented along each of two opposing edge faces of the light guide.

Figure 9:
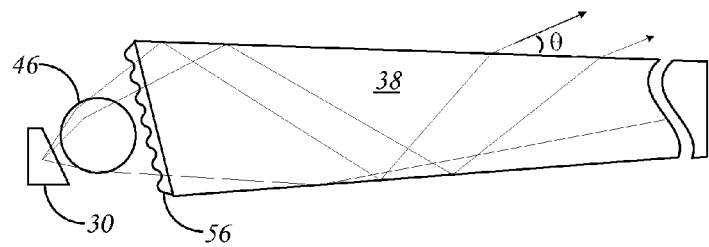
Figure 10:
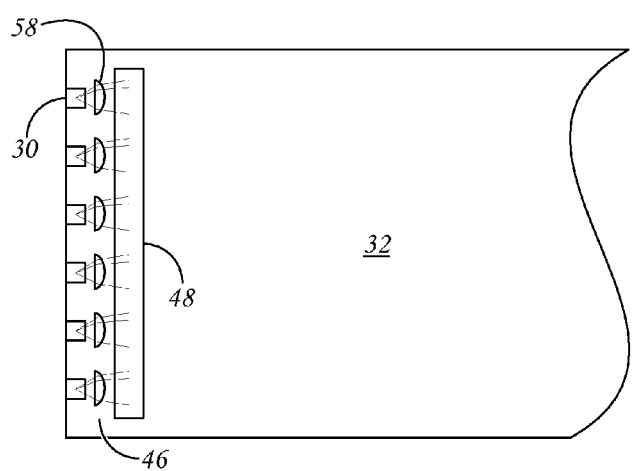

FIG. 9 is a schematic, cross-sectional view showing aspects of a coupling structure in another example embodiment. The illustrated coupling structure comprises rod lens 46 and lenticular array 56. The rod lens may be oriented near and parallel to an oblique edge face of light guide 38. In one embodiment, the lenticular array may be embedded in a film, which is bonded to the oblique edge face of the light guide. In other embodiments, the rod lens may be replaced by a one-dimensional, compound parabolic concentrator (1D-CPC) collector. In still other embodiments, the lenticular array may be supplemented by a 1D-CPC collector for combined optical power, and in one embodiment, the 1D-CPC may replace both the rod lens and the lenticular array.

The coupling structure illustrated in FIG. 9 may be used inter alia to couple light into an oblique edge face of a wedge-shaped light guide 38, such that the light coupled into the light guide exits via the upper face, as shown in the drawing. In this configuration, the spatial uniformity of the light exiting the upper face is related to the angular uniformity of the light coupling into the oblique edge face. Therefore, it is desirable that the coupling structure provide a highly uniform input of light as a function of incidence angle. This is achieved, in the embodiment of FIG. 9, by selecting a lenticular array 56 and/or 1D-CPC that projects light over a limited range and angles and with high angular uniformity. Further, rod lens 46 may be selected to collect light over a range of angles somewhat more acute than the exit cone of the lenticular array.

The coupling structure embodiments described hereinabove include collection optics (rod lenses, prisms, lenticular arrays, 1D-CPC collectors, and gratings) having optical power in one dimension only. Accordingly, these collection optics collect light from vision-system emitter 30 in one dimension only. They may span, therefore, an entire edge-length of the light guide so as to collect light from a plurality of vision-system emitters arranged at the edge, as shown by example in the plan view of FIG. 4. In other embodiments, however, a coupling structure may comprise analogous collection optics having optical power in two dimensions— dome lenses and 2D-CPC collectors, for example. In such embodiments, the coupling structure may include a series of collection optics coupled to a corresponding series of vision-system emitters, and further coupled to a light guide 32. Such an arrangement is shown, by example, in FIG. 10, where collection optics 58 comprise 2D collection optics.

It will be noted that while the various collection optics identified above may provide for improved coupling efficiency into the light guide, they may not be needed in all cases. For example when coupling at the edge of the light guide 32, a high coupling efficiency may be achieved without use of a collection optic, but due to the higher angular spread of the coupled light, a diffusing light extracting layer (vide infra) must provide for significantly less diffusing strength as compared to a case where the light is collected at lower divergence. This is because more of the light is subjected to a greater higher number of reflections. In configurations where the light is coupled from the bottom side of the light guide, however, coupling losses may be incurred when the light is not collected at a significantly low divergence.

Returning now to FIG. 9, wedge-shaped light guide 38 comprises substantially planar and opposing upper and lower faces. The upper and lower faces define a wedge angle, which may be between zero and one degree, in some examples. Opposing first and second edge faces of unequal height are arranged adjacent the upper and lower faces. As shown in FIG. 9, infrared light from vision-system emitter 30 enters the light guide via the coupling structure and propagates through the light guide via TIR. The light is conducted from the first edge face toward the second edge face, meets the upper or lower face at a subcritical incidence angle, and refracts out of the upper face of the light guide substantially collimated.

In the embodiment illustrated in FIG. 9, the angle of incidence of the coupled light with respect to the opposing upper or lower faces is reduced by twice the wedge half-angle upon each reflection. It follows that the incidence angle at the edge face where the light enters is mapped to position along the upper or lower face from which the light escapes. Since only the light violating the TIR condition exits the light guide, all light projected from the light guide exits at high angles, typically within a few degrees from the critical angle as determined by the refractive index of the light-guide medium, the refractive indices of the media surrounding the light guide (e.g., air), the angle of the light at the entry edge face, and, at higher order, the thickness of wedge and the vertical location of the input light at the wedge coupling face. Accordingly, these parameters may be chosen such that the great majority of the light exits the light guide at a relatively large exit angle. Providing a large exit angle is advantageous because it minimizes the amount of scattered light from the vision-system illuminator that could be admitted to imaging detector 26. Further, it can be shown that the spatial distribution of the light flux escaping the upper face of the light guide at large values of θ is controlled by the angular distribution of the light flux coupling into the light guide, as noted hereinabove.

Figure 11:
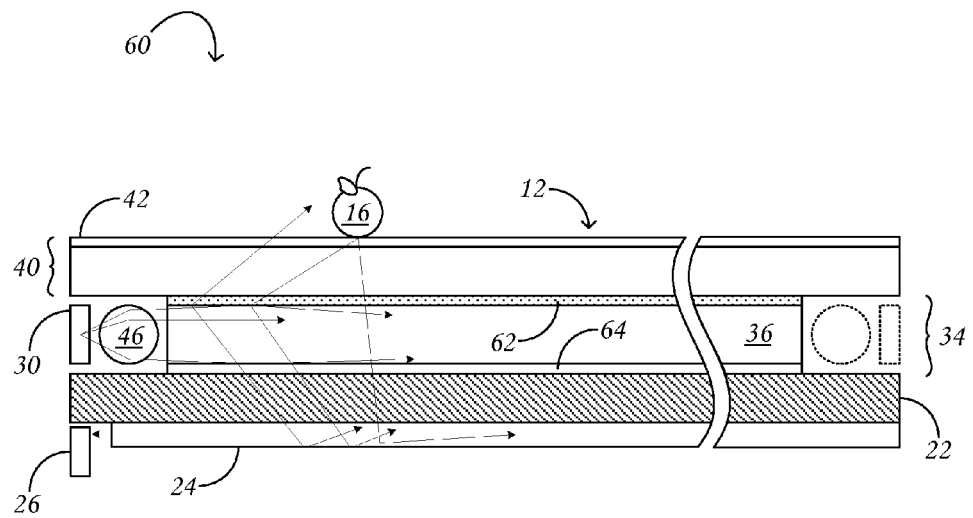
FIG. 11 is a schematic, cross-sectional view showing aspects of an optical system in another embodiment of the present disclosure.

FIG. 11 is a schematic, cross-sectional view showing aspects of an optical system in another example embodiment. Optical system 60 includes a sheet-like light guide 36 and a coupling structure 34 as shown in FIG. 8. In the embodiment illustrated in FIG. 11, the light guide may comprise a ca. 3 millimeter thick sheet of B270 glass, a product of Shott Glass, Inc. This product has a transmittance of 54 to 50 percent per meter path length at 850 nanometers.

Light guide 36 includes substantially planar and opposing upper and lower faces, and opposing first and second edge faces of substantially equal height adjacent the upper and lower faces. Infrared light from vision-system emitter 30 is conducted from the first edge face toward the second; by reflection from the opposing faces, infrared light coupled into the light guide propagates through the light guide via TIR. As further described below, the TIR condition may break down (i.e., be frustrated) in various ways, leading to various modes of touch- and/or object detection at the upper or lower faces.

For example, application of a finger on the upper face of light guide 36—or of protective layer 44 to which the light guide is optically coupled—may frustrate the TIR condition, allowing light to escape the light guide and reflect off the finger. The reflected light may then propagate back through the light guide at a relatively small angle with respect to the surface normal and be imaged by imaging detector 26. Further, as the flux of the reflected light depends on the contact area between the finger and the upper face of the light guide, a computer operatively linked to the imaging detector may be configured to respond to an increasing or decreasing contact area between the one or more objects and the display surface. In this manner, the computer may detect the pressure exerted on the surface and take appropriate action—turning up a volume, zooming in on a picture, etc.—in response to the touch event and/or continued applied pressure.

The modes of touch sensing described above rely on a face of the light guide being optically 'wetted' by a contacting object. However, many objects, due to their material properties or topology, will not reliably wet the surface with which they are placed in contact. Further, it may be desired that the vision system be able to sense an object which is near, but not touching, the display surface. Therefore, more generalized modes of object sensing are envisaged, which may be enacted instead of or in addition to the touch sensing described above. As further described below, the TIR condition may be frustrated to a controlled degree absent any contact from the object being detected. Accordingly, the optical systems described herein may be configured to enable touch sensing based as well as vision-based and sensing and tracking of objects near the display surface.

Accordingly, in optical system 60, diffusive layer 62 is arranged on the upper face of light guide 36, parallel to the upper and lower faces. The diffusive layer partly frustrates TIR at the interface between the upper face of the light guide and the layer above it—protective layer 44 in the illustrated embodiment. By interacting with the diffusive layer, some light that would otherwise be drawn through the light guide by TIR acquires a supercritical incidence angle, which allows it to escape the light guide. The escaping light may travel upward or downward with respect to the interface where the TIR is frustrated. The light that travels upward may illuminate one or more objects 16 placed on or near display surface 12.

Frustration of TIR and upward escape of light from light guide 36 may occur whether diffusive layer 62 is disposed on the lower face or on the upper face. In embodiments where the diffusive layer is arranged on the lower face of the light guide, an intervening air gap or other low-index layer may be used in order to ensure that TIR condition extends through reasonably small incidence angles, in order to optically isolate the light guide and prevent loss of light coupling into the layers below. Arranging the diffusive layer on the lower face of the light guide offers an advantage of reduced contrast loss for visible display light, as the weak diffusive effect of lowering display contrast decreases with reduced distance of the diffuser from the display layer. Further, when using a surface-relief type diffusive layer disposed on the lower face of the light guide, one notable advantage is a directional bias in the escaping light. Specifically, the flux of light escaping toward the upper face may be greater by 20 to 30 percent relative to the flux escaping in the opposite direction. In this manner, the escaping light can more efficiently illuminate objects on display surface 12.

In one embodiment, diffusive layer 62 may comprise a volume-type diffusive layer, in which a plurality of light-diffusing features are distributed in a three-dimensional volume on or within light guide 36. In one example, a volume-type diffusive layer may comprise a flexible film having a controlled density of light scattering centers, such as particles, distributed and fixed therein. The flexible film may be bonded to an upper or lower face of the light guide via an index-matched adhesive or in any other suitable manner. One example volume-type diffusive film layer is product ADF0505 of Fusion Optix Corporation.

A volume-type diffusive layer 62 offers a particular advantage when disposed on the upper face of light guide 36. When the volume-type diffusive layer is arranged in this manner, the light guide may be affixed directly to the layer above it with no intervening air gap. Omission of the air gap may not be advantageous for diffusive layers of the surface-relief type (vide infra), whose diffusive properties may be reduced by optical wetting. Elimination of the air gap is useful from an engineering standpoint; further it may reduce certain optical artifacts caused by Fresnel reflections of ambient light in the layered structure. It will be noted, however, that even if the diffusive layer is laminated directly on the top face of light guide, an air gap may still be used between the lower face and a moderate diffuser (not shown in FIG. 11), which may be laminated to the top side of LCD control layer 22. In this case, anti-reflection coatings at any of the various air interfaces of the optical system may be used to help diminish loss of contrast due to reflections of ambient light.

In another embodiment, diffusive layer 62 may comprise a surface-relief type diffusive layer, in which a plurality of light-diffusing features are arranged on a two-dimensional surface on or within light guide 36. For example, the diffusive layer may comprise periodic or aperiodic arrays of concave and convex lenslets or dimples or bumps. These can be used as extraction features, offering precise control of the escaping light. In one embodiment, the surface features may be molded directly on the light guide. Suitable molding techniques include thermal molding and uv-casting, as examples. In another embodiment, a film having such features may be laminated onto a face of the light guide, rolled thereon (e.g., by heat-press rolling), or formed by screen-printing. Screen-printing, in particular, is an example option that can offer low up-front cost as well as low production-volume cost. In such cases, problematic retooling costs associated with some diffuser technologies may be avoided. Further, screen-printing, rolling, and similar methods may reduce by one the number of laminations that would be required by alternative methods. Surface features that can be applied by rolling or screen printing include white TIR-frustrating dots, microdots, or diffusing pads. In other embodiments, the dots, microdots or diffusing pads may be visibly transparent, but infrared-reflective, such as a dichroic coated surface relief embedded within the light guide.

When coated with an anti-reflection coating, the diffusive layer arranged on the lower face may be less prone to scatter ambient light, providing a display surface having an overall cleaner and less milky appearance. In this context, it will be understood that display contrast may be reduced when any diffusive layer is placed in front of the display surface. Display contrast loss may increase as a given diffuser is placed at a plane further away from the display surface. Also, for a given separation distance, the display contrast loss increases as diffusing strength of the diffusive layer increases. In order to help reduce contrast loss due to diffuse ambient reflection, as opposed to direct image degradation caused by viewing a display layer through a diffuser, an anti-reflection coating may be applied to both sides of the air gap—on the lower face of the diffuser (laminated or molded onto lower face of light guide) and on the upper face of the moderate diffuser placed or laminated on top face of display. When using a surface relief-type diffuser disposed on lower face of light guide, one notable advantage includes a directional bias in scattered light toward the top by as much as 30% as compared to the light energy escaping toward the bottom, thus increasing the efficiency of usage of projected light toward objects on or near display surface 12.

Diffusion of light from volume- and surface-relief type diffusive layers can be described mathematically. When modeling such diffusion, it is convenient to represent the character of a substantially planar diffusive layer by a Gaussian distribution, rotationally symmetric in direction cosine space, and having a width determined by the diffusion strength $\sigma$. Accordingly, a desired target $\sigma$ can be related to an expected required normal transmitted distribution profile as described below.

For the volume-type diffusive layer, a convolution of n equal Gaussians gives $$\theta_{\mathit{eff}} = \sqrt{\theta_1^2 + \theta_1^2 + \ldots + \theta_1^2} = \sqrt{n\theta^2},$$

where $\theta_i$ is the full-width at half maximum (FWHM) of the angular scatter profile of each layer, $\theta$ represents the same angular width under the assumption that all diffuse layers are equal, and $\theta_{\mathit{eff}}$ is the resulting effective angular scatter profile for n contiguous layers having equal scatter profile. Inside the diffusive medium, the optical path is increased relative to the surface normal by a factor $c_p$, where $$c_p = \frac{1}{\cos\theta_{avg}},$$

and $\theta_{avg}$ is the average of the n Gaussians. For the volume-type diffusive layer, the optical path is doubled, so $$\theta_{eff} = \sqrt{2c_p\theta_N^2},$$

and also, $$\theta_N = \sqrt{\frac{\theta_{eff}^2}{2c_p}}.$$

When modeling via any suitable ray trace utility, the angular spread is defined in terms of a Gaussian having width defined by σ. In such case, σ can be converted into an effective FWHM angular width using the following relationship:

$$\theta_{eff} = 2\sqrt{\ln 2}\,\sigma,$$

and the corresponding effective angular width in air can be estimated as follows:

$$\theta_{eff,\,air} = 2\sin^{-1}\left[\frac{n_1}{n_0}\sin\left(\frac{\theta_{eff}}{2}\right)\right].$$

The desired normal exit profile in air of the volume-type diffusive layer is therefore $$\theta_{N,air} = \sqrt{\frac{\theta_{eff,air}^2}{2c_p}}.$$

In such manner, the target diffuse character (defined by σ) for achieving a given output uniformity across the exit face of the light guide may be computed for a given light guide thickness, interaction length, material absorption loss, and pointing and divergence of the coupled light. Then, the resulting σ may be converted to a more physical design metric in order to select an appropriate diffusive layer—as some diffusers are characterized for angular scatter profile at normal incidence and in air. Finally, it will be noted that as the above analysis deals with Gaussian profiles, significant departure the angular scatter profile from Gaussian may influence the effective angular width used in the modeling above. In such case as a volume-type diffusive layer, the profile may be more appropriately described by a Henyey-Greenstein profile, and thus exhibit a profile such that half the energy within the profile exists within an angular width that is slightly beyond the FWHM of the profile, thus requiring an additional factor based on energy distribution. However, it is thought that once a target σ is determined through model optimization, such conversion of the sigma value as described above may provide a reasonably close description of the diffuse character required of the diffusive layer at normal incidence and in air, so that a suitable diffusive layer may be chosen for the light guide.

Similarly, for a surface-relief diffusive layer, $$\theta_{eff} = \sqrt{\theta_1^2 + \theta_1^2 + \ldots + \theta_1^2}$$

For model inside media, use measured reflected full-width at half maximum, at mean angle, $$c_p = \frac{1}{\cos\theta_{avg}}\theta_m.$$

Now, the expected transmission response at normal incidence is determined, $$\theta_T = \sin^{-1}\frac{n_1\sin(\theta_m/2)}{n_0} - \frac{\theta_m}{2}.$$

Finally, the following relationship is obtained:

$$\theta_{eff} = c_r\theta_T, \text{ where } c_r = \frac{\theta_M}{\theta_T}.$$

Application of the theory above provides guidance for the conversion of appropriate values of σ to meaningful angular scatter profile widths for diffusive layers 62 in the various embodiments contemplated herein. In one example, with the coupling structure embodiment illustrated in FIG. 3, the calculated optimum value of σ for providing uniform illumination from the light guide depends strongly on the interior angles of the corner prism, the value changing from 0.035 for a 60 degree interior angle adjacent rod lens 46 to 0.06 for a 75 degree interior angle.

Additional parameters that affect the uniformity distribution at the exit face of the light guide include: the thickness t of the light guide, the length L of the diffuser interaction region, the material absorption at the vision-system emitter wavelength(s), and the angular distribution of the light coupled into the light guide. As might be expected, the rate of extraction of light increases over a given distance with an increasing number of reflections at the light-conduit/diffusive layer interface. As such, a thinner light guide will exhibit more reflections over a given distance as compared with a thicker light guide, thus requiring a less strongly diffusive layer. For similar reasons, interaction over a longer region L will require a less strongly diffusive layer. Further, attenuation due to material absorption causes light loss at an increased rate over a given distance, and thus will require a less strongly diffusive layer in order to maintain uniformity. The angular content of the light coupled into the light guide impacts the number of reflections the light undergoes for a given thickness, and thus dictates a need for a weaker diffuser in embodiments where the diffusive layer is coupled to the lower face of the light guide. As such less diffusing power is needed for higher input angles in order to maintain uniformity at the exit face.

In one embodiment, diffusive layer 62 may be uniformly diffusive as a function of distance from one or more collection optics in the coupling structure—e.g., from rod lens 46 in FIG. 11. It may comprise an homogenously formed volume-type diffusive layer or a surface-relief type diffusive layer in which the dimples, dots, lenslets, etc., are of similar size, focal properties, and/or diffusing power, and are spaced homogeneously. In such embodiments, the light flux escaping the upper face of light guide 36 will be maximum near the coupling structure and will decay exponentially with increasing distance from the coupling structure.

In embodiments where such a diffusive layer is used, and where light is coupled into a single edge-face of light guide 36, the illumination may be stronger towards the edge of the light guide where the light is received. In embodiments where such a diffusive layer is used, but where light is coupled into two opposing edge faces of the light guide, the resulting illumination may be more uniform, and may be satisfactorily uniform for some applications.

However, to provide illumination of still greater uniformity, embodiments are contemplated wherein the light-diffusing strength σ of the diffusive layer changes as a function of distance from the coupling structure. For example, the light-diffusing strength may increase with increasing distance from the coupling structure; the diffusive layer may be minimally diffusive nearest the coupling structure and may become increasingly diffusive with increasing distance from the coupling structure. A graded diffusive layer of this kind may comprise an inhomogeneously formed volume-type diffusive layer, with a density of scattering centers increasing with increasing distance from the coupling structure, or, a surface-relief type diffusive layer in which the dimples, dots, lenslets, etc., are arrayed in a series of increasing size, increasing diffusing power or decreasing pitch, as distance from the coupling structure increases. In embodiments where light is coupled into opposing edges of the light guide, the light-diffusing strength of the diffusive layer may be weaker nearest the opposing edges and stronger in a middle portion of the light guide. In some cases, the variation in diffuse strength required to achieve high uniformity across the exit face of the light guide may be substantially Gaussian in shape, having a non-zero bias.

Figure 12:
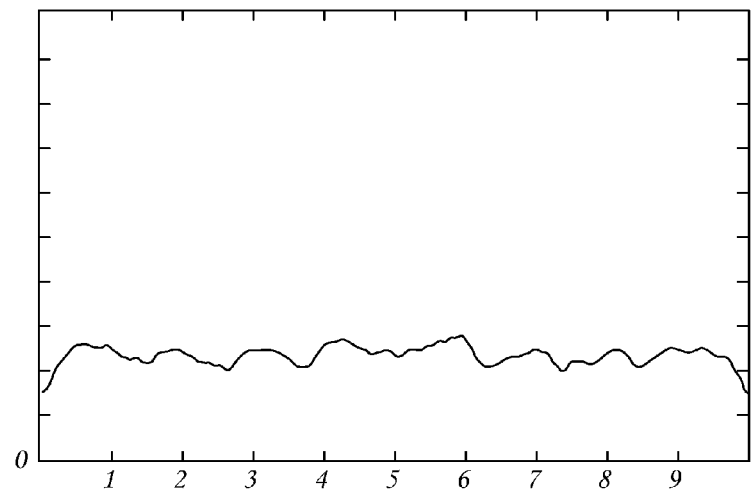
FIG. 12 shows a plot of irradiance versus distance across a light guide, in accordance with an embodiment of the present disclosure.

In embodiments where the light-diffusing strength of diffusive layer 62 changes as a function of distance from the coupling structure, the change may be continuous—resulting from a continuous change in scattering center density, surface-relief feature properties, etc. In other embodiments, the change in light-diffusing strength may be realized in discrete steps—resulting from a stepwise change in these properties. By way of example, FIG. 12 shows a graph of irradiance data for a light guide having a stepped variable diffusive layer applied to the lower face. In this example, the diffusive layer comprises ten stripe-shaped zones of equal width aligned parallel to the opposing edge faces of the light guide, from which the light is coupled into the light guide. Here, the light-diffusing strength σ of the stripe shaped zones increases in the series 0.075, 0.076, 0.088, 0.110, 0.140 from one edge to the middle of the light guide, then decreases in the series 0.140, 0.110, 0.088, 0.076 and 0.075 to the other edge. In the graph of FIG. 12, the relative intensity of light projected from the light guide is plotted on the vertical axis, and distance in terms of diffusing zones across the light guide is plotted on the horizontal. Note that although the average intensity is fairly constant across the light guide, intensity dips associated with transition between the zones are apparent. When the diffusing strength is varied in a continuous manner across the light guide, as opposed to stepped, the output uniformity across the light guide may be further improved.

Returning now to FIG. 11, diffusive layer 62 will generally cause light to escape from light guide 36 with comparable upward and downward flux. While the exit angle of the escaping light may be large enough, and the field of view of imaging detector 26 small enough, to avoid significant contrast loss due to downwardly scattered light reaching the imaging detector, it remains true that such light would be wasted absent some measure to reclaim it. In some embodiments, therefore, the light guide may comprise a reflective and transmissive filter layer arranged parallel to the diffusive layer and on a side of the diffusive layer opposite the display surface. The filter layer may be more reflective and less transmissive to light of greater incidence angles than to light of lower incidence angles. Further, the filter layer may be more reflective and less transmissive to infrared light than to visible light.

Figure 13:
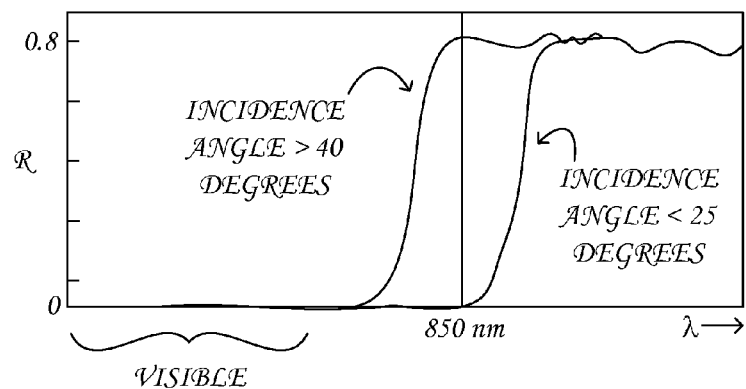
FIG. 13 shows a plot of reflectance R of a filter layer as a function of wavelength for two ranges of incidence angles, in accordance with an embodiment of the present disclosure.

Accordingly, the embodiment illustrated in FIG. 11 includes filter layer 64 disposed on the lower face of light guide 36. The filter layer may be configured to exhibit wavelength-selective transmissivity and reflectivity as described above. In particular, the filter layer may be substantially transmissive in the one or more visible wavelength bands, for example, and much more reflective to incident light at relatively large incidence angles than to incident light at relatively small incidence angles. Such properties are illustrated by example in FIG. 13, in which reflectance R is plotted as a function of wavelength for two ranges of incidence angles. Applied to the lower face of the light guide, the filter layer may increase the efficiency of object illumination by 50 to 100 percent by redirecting downwardly diffused light that would otherwise escape the lower face of the light guide and be unusable for illumination of objects 16 on display surface 12.

Filter layer 64 may comprise an interference coating. In one embodiment, the filter layer may have the structure of a dichroic filter, in which a plurality of thin (10 to 100 nanometer) layers of controlled refractive index are stacked upon each other. In another embodiment, the filter layer may have the structure of a rugate filter, in which the refractive index of a material varies continuously in a controlled manner. In one embodiment, the filter layer may be designed to exhibit phase-matching at the light guide interface where it is applied, so that Fresnel reflections are minimized. In this case, light guide 36 may be laminated onto another substrate whilst preserving the TIR condition at the laminate interface. By combining the filter layer with lamination, it is possible to provide a high-contrast display image while increasing the efficiency of the vision-system illuminator. Moreover, lamination may increase the rigidity of the layered optical system, enabling an overall thinner design, thereby improving vision-system fidelity.

Figure 14:
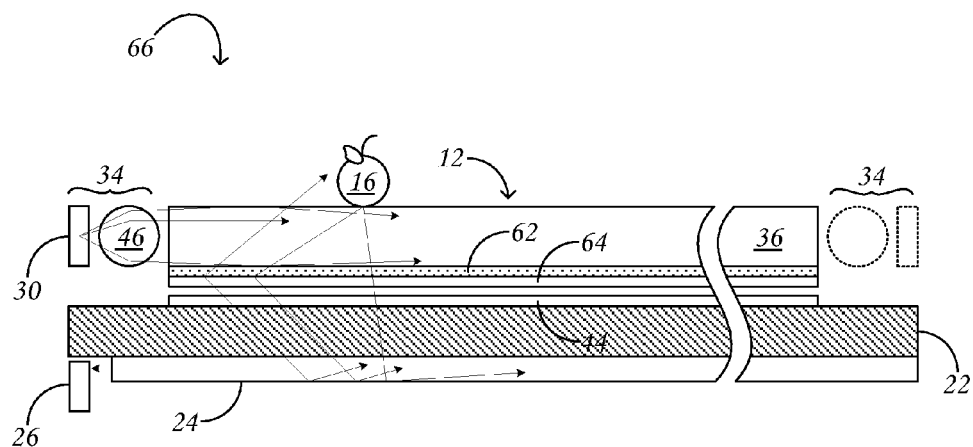
FIG. 14 is a schematic, cross-sectional view showing aspects of an optical system in another embodiment of the present disclosure.

FIG. 14 is a schematic, cross-sectional view showing aspects of an optical system in another example embodiment. In optical system 66, sheet-like light guide 36 itself serves as the protective layer. In this embodiment, the light guide is disposed above LCD control layer 22. Surface-relief type diffusive layer 62 is arranged on the lower face of the light guide, for efficient illumination of objects on or near display surface 12, and a thin air gap is provided to optically isolate the light guide.

Continuing in FIG. 14, moderately diffusive layer 44 is laminated on the top face of LCD control layer 22, and the vision system, substantially as described hereinabove, is arranged below the LCD control layer. In view of at least three design aspects, each described above in the context of other embodiments, the configuration illustrated in FIG. 14 provides highly efficient illumination of objects arranged on or near display surface 12. First, the LCD control layer is arranged outside of the illumination path of the light guide, where it causes no attenuation of the projected light. Second, surface-relief type diffusive layer 62 is arranged on the lower face of the light guide, where it may bias the illumination towards the display surface. Third, filter layer 64 is arranged below the diffusive layer and is configured to redirect a substantial amount of the light that does diffuse in the downward direction so that it becomes useful for illuminating the objects.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An integrated vision and display system comprising:
   a display-image forming layer configured to transmit a display image for viewing through a display surface;
   an imaging detector configured to image infrared light of a narrow range of angles relative to the display surface normal, the imaged infrared light including a reflection from one or more objects arranged on or near the display surface;
   a vision-system emitter configured to emit the infrared light, for illuminating the one or more objects; and
   a visible- and infrared-transmissive light guide having opposing upper and lower faces, opposing edge faces adjacent the upper and lower faces, and a volume-type diffusive layer arranged on or within the light guide and parallel to the upper and lower faces, the light guide configured to receive the infrared light from the vision-system emitter, to conduct the infrared light from one edge face toward the opposing edge face via total internal reflection from the upper and/or lower face, and, by frustration of the total internal reflection by the volume-type diffusive layer, to project the infrared light onto the one or more objects, the volume-type diffusive layer including a plurality of light-diffusing features distributed three dimensionally.

2. The system of claim 1, wherein the light guide is layered between the display-image forming layer and the display surface.

3. The system of claim 1, wherein the display-image forming layer is layered between the light guide and the display surface.

4. The system of claim 1, wherein the vision-system emitter comprises a plurality of infrared emitters arranged along one or more edges of the light guide.

5. The system of claim 1, wherein the light guide is sheet-like, having opposing first and second edge faces of substantially equal height adjacent the upper and lower faces.

6. The system of claim 1, wherein a light-diffusing strength of the diffusive layer increases with increasing distance from the vision-system emitter.

7. The system of claim 1, wherein opposing collection optics couple infrared light into opposing edges of the light guide, and wherein a light-diffusing strength of the volume-type diffusive layer is weaker nearest the opposing edges and stronger in a middle portion of the light guide.

8. The system of claim 1, wherein the light guide comprises a reflective and transmissive filter layer arranged parallel to the volume-type diffusive layer and on a side of the volume-type diffusive layer opposite the display surface, wherein the filter layer is more reflective and less transmissive to light of greater incidence angles than to light of lower incidence angles, and wherein the filter layer is more reflective and less transmissive to infrared light than to visible light.

9. The system of claim 8, wherein the filter layer comprises one or more of an interference filter, a dichroic filter, and a rugate filter.

10. The system of claim 1, further comprising a computer configured to send display data to the display-image forming layer and to receive image data from the imaging detector, wherein the computer is responsive to a position of the one or more objects arranged on or near the display surface, and to an increasing or decreasing contact area between the one or more objects and the display surface.

11. The system of claim 1 wherein the light guide directly contacts an optical layer above it with no intervening air gap.

12. An integrated vision and display system comprising:
    an LCD layer configured to transmit a display image for viewing through a display surface;
    a digital camera configured to image infrared light of a narrow range of angles relative to the display surface normal, the imaged infrared light including a reflection from one or more objects arranged on or near the display surface;
    a vision-system emitter configured to emit the infrared light, for illuminating the one or more objects;
    a visible- and infrared-transmissive light guide having opposing upper and lower faces, opposing edge faces adjacent the upper and lower faces, with the lower face oriented opposite the display surface, the light guide supporting a surface-relief-type diffusive layer on the lower face and an interference filter layer directly below the diffusive layer, the light guide and configured to receive the infrared light from the vision-system emitter, to conduct the infrared light from one edge face toward the opposing edge face via total internal reflection from the upper and/or lower face, and, by frustration of the total internal reflection by the diffusive layer, to project the infrared light onto the one or more objects, the filter layer configured to be more reflective and less transmissive to light of greater incidence angles than to light of lower incidence angles, and more reflective and less transmissive to infrared light than to visible light;
    at least one collection optic configured to partly converge and couple light from the vision-system emitter into the light guide and;
    a computer configured to send display data to the LCD layer and to receive image data from the digital camera, wherein the computer is responsive to a position of the one or more objects arranged on or near the display surface, and to a touch pressure-induced increasing or decreasing contact area between the display surface and a finger in contact with the display surface.

13. The system of claim 12, wherein the light guide is wedge-shaped, having opposing first and second edge faces of unequal height adjacent the upper and lower faces, and wherein infrared light from the vision-system emitter is conducted from the first edge face toward the second edge face, meets the upper or lower face at a subcritical incidence angle, and refracts out of the light guide to illuminate the one or more objects.

14. The system of claim 12, wherein a light guide is sheet-like, having opposing first and second edge faces of substantially equal height and a diffusive layer arranged parallel to the upper and lower faces, and wherein infrared light from the vision-system emitter is conducted from the first edge face toward the second, interacts with the diffusive layer, and is diffused out of the light guide to illuminate the one or more objects.

15. The system of claim 14, wherein the diffusive layer comprises a plurality of light-diffusing features arranged on a two-dimensional surface on or within the light guide.

16. An integrated vision and display system comprising:
an LCD layer configured to transmit a display image for viewing through a display surface;
a digital camera configured to image infrared light of a narrow range of angles relative to the display surface normal, the imaged infrared light including a reflection from one or more objects arranged on or near the display surface;
a vision-system emitter configured to emit the infrared light, for illuminating the one or more objects;
a visible- and infrared-transmissive light guide having opposing upper and lower faces and opposing edge faces adjacent the upper and lower faces, with the lower face oriented opposite the display surface, the guide supporting a surface relief type diffusive layer arranged on the lower face, and an interference filter layer directly below the diffusive layer, the light guide configured to receive the infrared light from the vision-system emitter, to conduct the infrared light from one edge face toward the opposing edge face via total internal reflection from the upper and/or lower face, and, by frustration of the total internal reflection by the diffusive layer, to project the infrared light onto the one or more objects, the filter layer configured to be more reflective and less transmissive to light of greater incidence angles than to light of lower incidence angles, and more reflective and less transmissive to infrared light than to visible light; and
at least one collection optic configured to partly converge and couple light from the vision-system emitter into the light guide.

17. The system of claim 16, wherein the interference filter layer comprises one or more of a dichroic filter and a rugate filter.

18. The system of claim 16 wherein the LCD layer is arranged below the filter layer, and further arranged so that the infrared light reflected from the one or more objects passes through the LCD layer en route to the digital camera.

19. The system of claim 16 wherein the diffusive layer is sandwiched between the interference filter layer and the lower face of the light guide.

* * * * *